Sept. 29, 1959 D. I. HAYES 2,906,418
SELF LOADING TRANSPORT WITH FRONT UNLOADING
Filed Dec. 30, 1957 11 Sheets-Sheet 1

INVENTOR.
Dale I. Hayes
BY
[signature]
Atty.

Sept. 29, 1959 D. I. HAYES 2,906,418

SELF LOADING TRANSPORT WITH FRONT UNLOADING

Filed Dec. 30, 1957 11 Sheets-Sheet 2

INVENTOR.
Dale I. Hayes
BY
[signature]
Atty.

Sept. 29, 1959 D. I. HAYES 2,906,418

SELF LOADING TRANSPORT WITH FRONT UNLOADING

Filed Dec. 30, 1957 11 Sheets-Sheet 3

INVENTOR.
Dale I. Hayes
BY
Atty.

Sept. 29, 1959 D. I. HAYES 2,906,418

SELF LOADING TRANSPORT WITH FRONT UNLOADING

Filed Dec. 30, 1957 11 Sheets-Sheet 4

INVENTOR.
Dale I. Hayes
BY
Atty.

SELF LOADING TRANSPORT WITH FRONT UNLOADING

Filed Dec. 30, 1957 11 Sheets-Sheet 5

INVENTOR.
Dale I. Hayes
BY
[signature]
Atty.

Sept. 29, 1959 D. I. HAYES 2,906,418

SELF LOADING TRANSPORT WITH FRONT UNLOADING

Filed Dec. 30, 1957 11 Sheets-Sheet 6

INVENTOR.

Dale I. Hayes

BY [signature]

Atty.

Sept. 29, 1959 D. I. HAYES 2,906,418

SELF LOADING TRANSPORT WITH FRONT UNLOADING

Filed Dec. 30, 1957 11 Sheets-Sheet 7

INVENTOR.

Dale I Hayes

BY

[signature]

Atty.

Sept. 29, 1959 D. I. HAYES 2,906,418

SELF LOADING TRANSPORT WITH FRONT UNLOADING

Filed Dec. 30, 1957 11 Sheets-Sheet 8

INVENTOR.
Dale I. Hayes
BY
[signature]
Atty.

SELF LOADING TRANSPORT WITH FRONT UNLOADING

INVENTOR.
Dale I. Hayes
BY
[signature]
Atty.

SELF LOADING TRANSPORT WITH FRONT UNLOADING

Filed Dec. 30, 1957 11 Sheets-Sheet 10

INVENTOR.
Dale I. Hayes
BY [illegible]
Atty.

INVENTOR.

Dale I. Hayes

BY [signature]

Atty.

United States Patent Office 2,906,418

Patented Sept. 29, 1959

2,906,418

SELF LOADING TRANSPORT WITH FRONT UNLOADING

Dale I. Hayes, Knoxville, Tenn., assignor to American Zinc, Lead and Smelting Company, St. Louis, Mo., a corporation of Maine Application December 30, 1957, Serial No. 706,013

14 Claims. (Cl. 214—78)

The present invention relates to improvements in a self-loading transport. In my prior patents, Nos. 2,518,471 and 2,743,828, I have disclosed a machine of this character which comprises a body unit, an intermediate fold back trough member having its lower rear corners pivoted in the body unit, and a shovel having its rear lower corners pivoted to the fold back member. The shovel is capable of rocking or tilting with respect to the member and the member is capable of rocking or tilting with respect to the body unit. As disclosed in the above mentioned patents the machine is operable to load loose material such as ore, sand, dirt, etc. by scooping it up with the shovel, then rocking the shovel back to deposit the material in the trough member, and when the trough member has been filled, folding the trough member back to crowd the loaded material back into the body unit.

The devices disclosed in the above mentioned patents are designed for use primarily in enclosed areas such as mine tunnels, etc. and the unloading means disclosed in these patents comprises means for opening the bottom and rear of the body unit to permit the loaded material to fall into a dump pit over which the transport is positioned.

I have found that a self-loading transport having the general characteristics disclosed in the above mentioned patents provides an extremely useful loading and transporting device for surface work as well as for underground operations. In many operations, whether underground or not, it is often desirable to unload the transported material in front of the machine upon the surface whereon the machine travels as well as into depressed dumping facilities. Accordingly, it is the principal purpose of this invention to provide a self-loading transport having the general characteristics of those shown in my above mentioned prior patents with means to open the front of the transport while the shovel and fold back members are raised to permit material carried thereby to be discharged forwardly onto the ground surface in a manner that prevents the dumped material from interfering with or damaging vulnerable parts of the machine.

More specifically, it is the purpose of this invention to provide a device of the character described wherein the bottom wall of the intermediate fold back member is movable forwardly and upwardly from its normal position to open the space between the side walls of said intermediate fold back member when it is rocked back whereby to provide an opening at the front of the body member through which the transported material may be discharged.

Another purpose of the invention is to provide means for tilting the bottom wall or floor of the load receiving body portion of the transport to complete discharge of material through the front opening created by moving the bottom wall of the fold back member.

Still another purpose of the invention is to provide novel control means for selectively controlling the removal of said bottom wall of the intermediate fold back member.

A further purpose of the invention is to provide a novel construction of the body member, fold back member and shovel whereby they are capable of withstanding the outward pressure of the load and yet may open the front of the body for forward discharge of the transported material.

It is also a purpose of my invention to provide a novel body construction which includes means for supporting ground engaging wheels at each side thereof, and means for confining the dumped material between the wheels to prevent said material from falling against the wheels and damaging them or from falling into their path.

These and other objects of the invention will be more clearly understood from the following detailed description of the invention, and the accompanying drawings which illustrate the preferred forms thereof. It should be understood, however, that the drawings and description are illustrative only, and are not intended to limit the invention except insofar as it is limited by the claims.

Figures 1, 10:
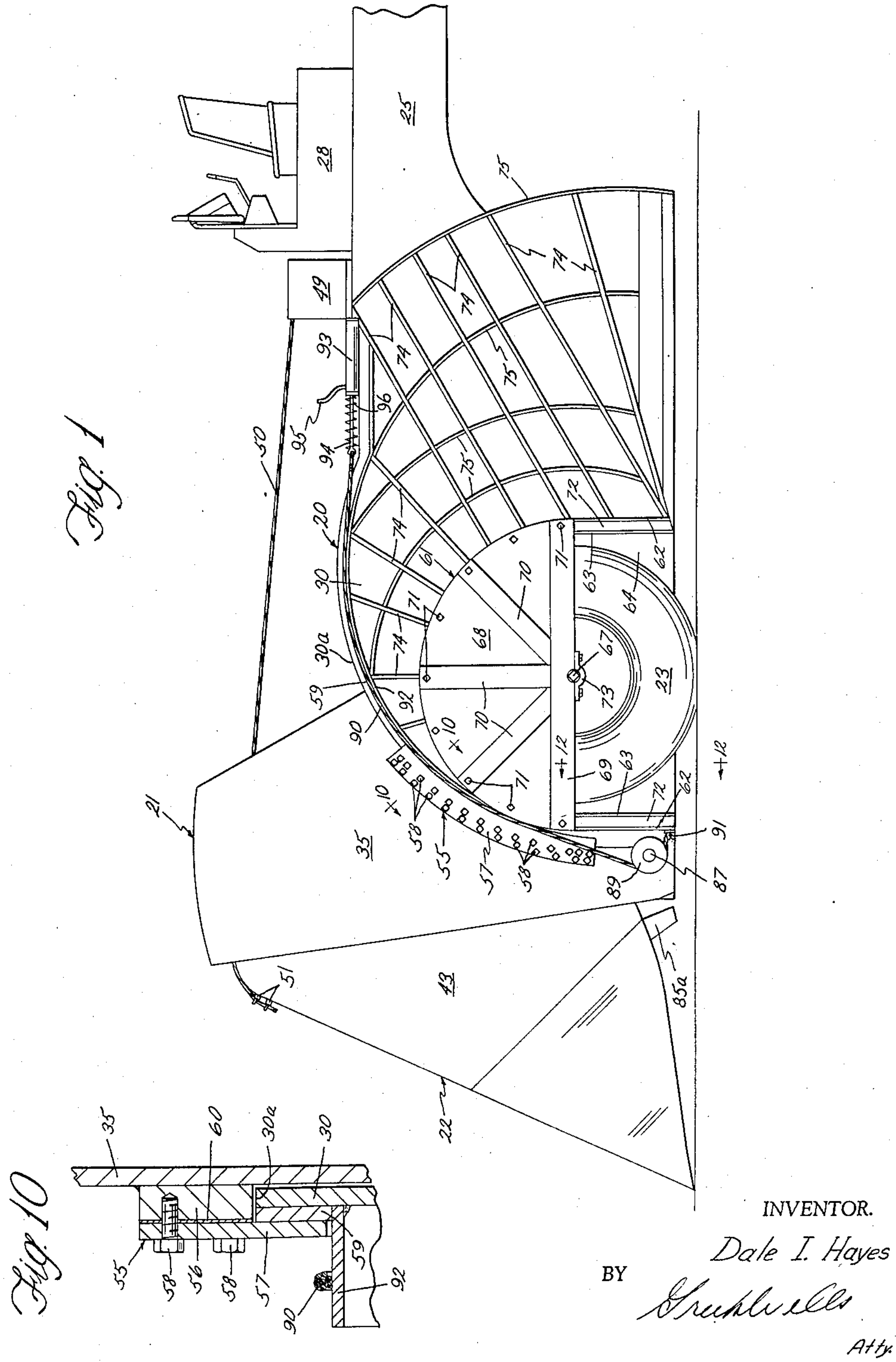
Figure 1 shows a side elevational view of my improved self-loading transport.
Figure 10 is an enlarged fragmentary sectional view taken on the line 10—10 of Figure 1.
Figure 2:
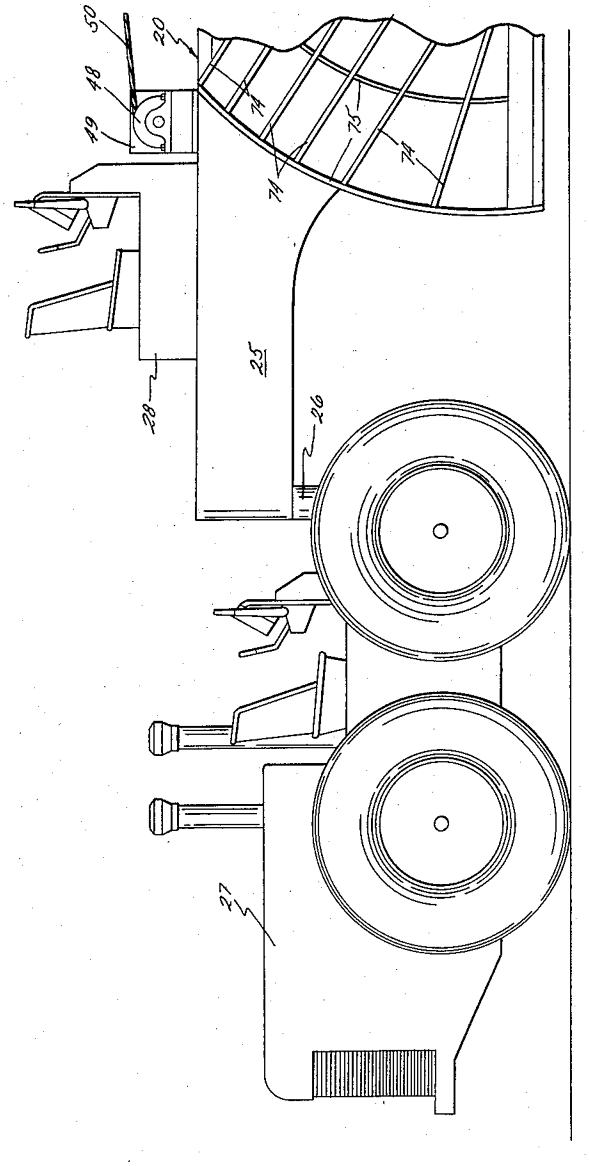
Figure 2 shows the rear end of the transport with a powered vehicle coupled thereto which provides motive power therefor.

Referring now to the drawings, and to Figures 1 to 8 in particular, my invention is shown as embodied in a self-loading transport which comprises a load receiving body portion 20, the front end of which is open. A trough or intermediate fold back member 21 is provided at the front of the body 20, and is pivoted at its lower rear corners to the body 20. The member 21 is capable of being rocked back and forth on the body 20. The member 21 is open at the front and back, and has a shovel 22 positioned at its front end. The shovel 22 is pivoted at its lower rear corners to the member 21. The shovel 22 is capable of being rocked back and fotth on the member 21.

The body 20 of the machine is supported by two ground engaging wheels 23 and 24 and has a rearwardly extending arch frame 25 thereon which is supported on a pivot post 26 at its rearward end. A powered vehicle 27 (see Figure 2) carries the pivot post 26 and is thus pivotally coupled to the transport to provide motive power therefor. A control station or operator's platform is provided on the arch frame 25 as indicated at 28 in the drawings. Control mechanisms for operation of the powered vehicle 27 and for the power devices (hereinafter described) of the transport are located on the operator's platform 28 so that a single operator may manipulate both the powered vehicle 27 and the self-loading transport as a single unit.

The basic principle of operation of my improved self-loading transport is the same as that disclosed in my prior patents, No. 2,518,471 and No. 2,743,828, hereinbefore mentioned. The member 21 and shovel 22 are initially lowered to the positions shown in Figure 1, and the transport is maneuvered to force the shovel 22 into the material to be loaded. The shovel 22, once filled, is raised to the position shown in Figure 3, to move its load into the member 21 and the body 20. As soon as the member 21 becomes filled, the shovel 22 and member 21 are rocked back to the position shown in Figure 6 to crowd the loaded material back into the body 20. This process is repeated until the body 20 and the member 21 are filled with material to be transported. When the transport has been fully loaded, the shovel 22 is rocked back to form a front wall or closure and the transport is moved, together with its load, to an unloading area where it is emptied.

As hereinbefore stated, the principal purpose of the invention is to provide a machine having the general characteristics just described which is capable of unloading the transported material forwardly upon the ground surface in front of the machine, as well as into depressed dumping facilities machine. To accomplish this result, a substantially different construction from that described in my prior patents is necessary. A detailed description of the device, illustrating this new construction follows.

Figure 8:
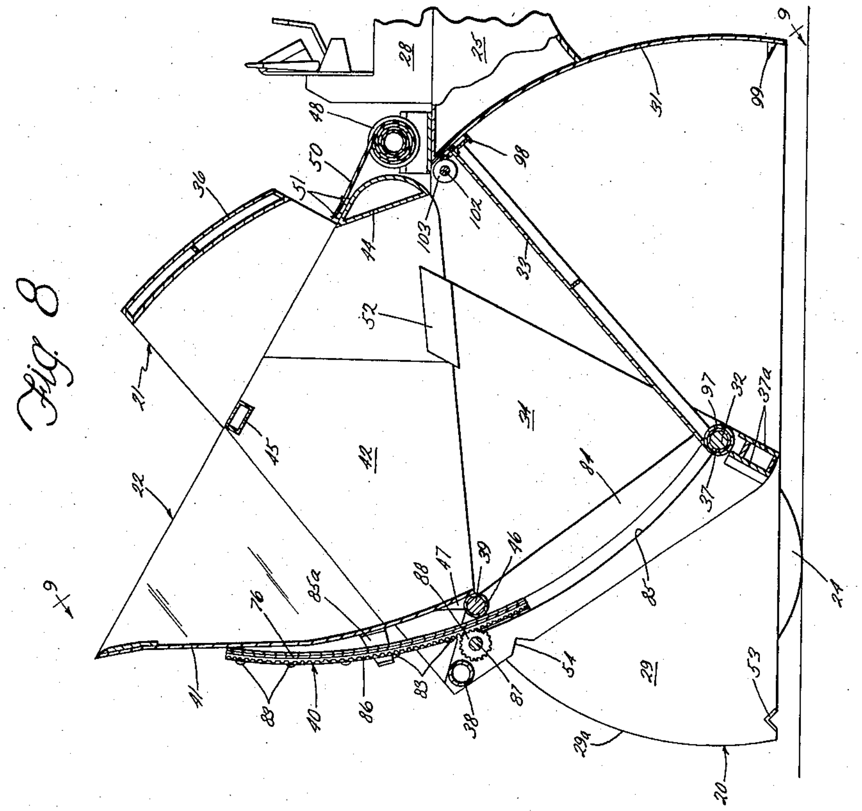
Figure 8 is a sectional view similar to Figure 7, but showing the device in position to discharge the transported material.
Figure 7:
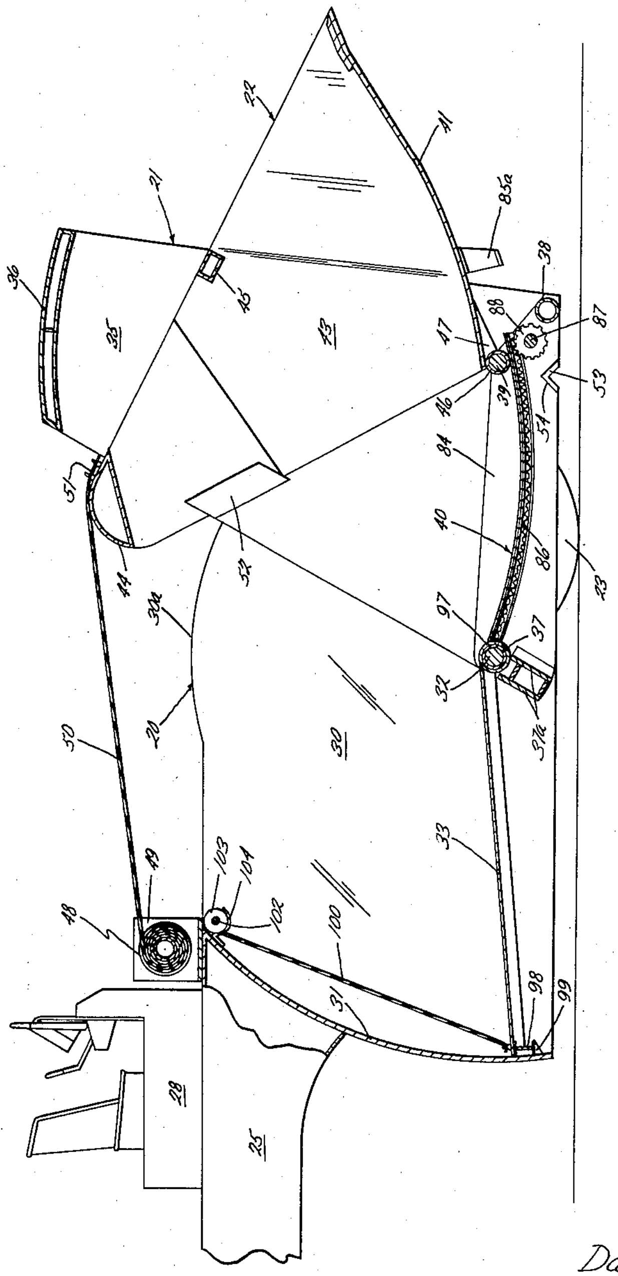
Figure 7 is a longitudinal sectional view through the transport taken substantially on the line 7—7 of Figure 5, but showing the shovel rocked back.
Figure 18:
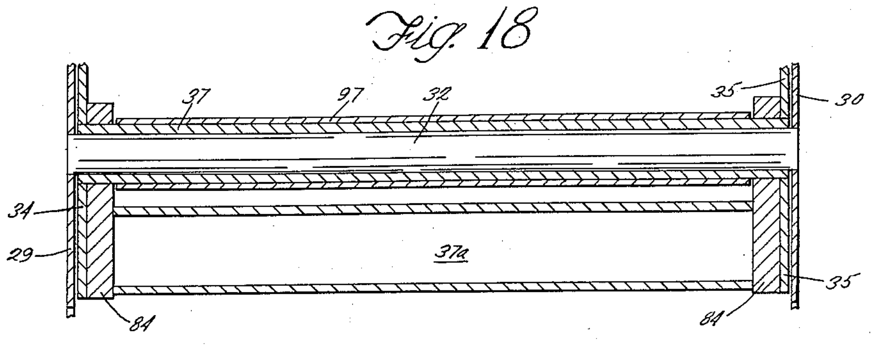
Figure 18 is a fragmentary sectional view taken on the line 18—18 of Figure 14.
Figure 19:
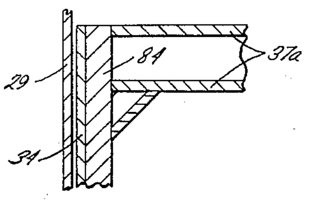
Figure 19 is a fragmentary sectional view taken on the line 19—19 of Figure 14.

As best shown in Figures 1, 4, 5 and 7, the body 20 of the device comprises a pair of spaced apart side walls 29 and 30 joined together by a curved rear wall 31. The arch frame 25 extends rearwardly from the rear wall 31. Near the centers of the side walls 29 and 30, a cross shaft 32 is provided. As illustrated in Figures 7 and 18 the cross shaft 32 is fixed rigidly between the side walls 29 and 30, and provides a cross tie between them. The rear wall 31 is curved about the axis of the shaft 32 as a center. A bottom wall 33 is provided between the side walls 29 and 30 and extends from the rear wall 31 forwardly to the cross shaft 32. As will be hereinafter described in more detail, the bottom wall 33 is pivoted on the cross shaft 32 for vertical movement between the side walls 29 and 30 to facilitate dumping. In front of the cross shaft 32, and between the spaced apart side walls 29 and 30 of the body 20, the member 21 is positioned. The member 21 comprises two spaced apart side plates 34 and 35 positioned just inside the walls 29 and 30. The side plates 34 and 35 of the member 21 are connected together at their upper ends by a top frame 36. They are connected together at their lower ends by a sleeve 37 positioned near the rear edges thereof, a tubular brace 38 positioned adjacent the front edge thereof, and a shaft 39 mounted upwardly and rearwardly of the brace 38. A cross frame 37*a* is also provided between the side walls below the sleeve 37. This frame 37*a* serves as a lip or apron over which the transported material spills during unloading as shown in Figure 8. The sleeve 37 serves as the hinge about which the member 21 is rocked, and is rotatably mounted on the cross shaft 32 for this purpose. The member 21 is thus supported on the body 20 by the sleeve 37 and shaft 32.

In addition to the side plates 34 and 35 and the top frame 36, the trough member 21 has a bottom wall 40 which extends between the side plates 34 and 35 thereof near the bottom. The bottom wall 40 receives the material to be loaded from the shovel 22 and serves to crowd the material back into the body 20 when the trough member 21 is rocked back. The bottom wall 40 is movable forwardly of the side plates 34 and 35 of the member 21, as will presently appear, to open the space between the lower ends of the side plates 34 and 35 and in front of the cross shaft 32 to permit the material carried by the body to be unloaded over the cross shaft 32 and onto the ground between the forward ends of the side walls 29 and 30 of the body 20. The construction of the bottom wall 40 and the means for moving the wall 40 with respect to the trough 21 will be described later herein.

The shovel member 22 of the self-loading transport comprises a bottom plate 41 supported at each side by vertical side plates 42 and 43. A cross frame 44 connects the side plates 42 and 43 at the top. An additional cross brace 45 is provided intermediate the top and bottom of the side plates 42 and 43 to give additional rigidity to the shovel 22. At the lower rear corner of the shovel 22 a transverse sleeve 46 is provided. The sleeve 46 is positioned at the rear edge of the bottom plate 41 and is fixed thereto by gusset plates 47. The sleeve 46 is rotatably mounted upon the cross shaft 39 that extends between the side plates 34 and 35 of the trough or intermediate fold back member 21 near the lower front corners thereof. The shovel 22 is thus pivoted to the trough 21 for rocking movement about the shaft 39.

In order to rock the shovel 22 and the trough 21 with respect to the body 20, a motor driven winch 48 is provided. The winch 48 is mounted on the arch frame 25 immediately behind the rear wall 31 of the body 20. A motor 49 is coupled to the winch 48 to provide power therefor. The winch 48 has a cable 50 wrapped thereon, the free end of which extends forwardly and is rigidly secured to the top cross frame 44 of the shovel 22 as clearly shown at 51 in the drawings. By operation of the winch 48 to wind or unwind the cable 50, the shovel 22 can be rocked up and down on the trough 21 between the ground engaging position shown in Figure 1 and the upraised position shown in Figure 3.

Figure 3:
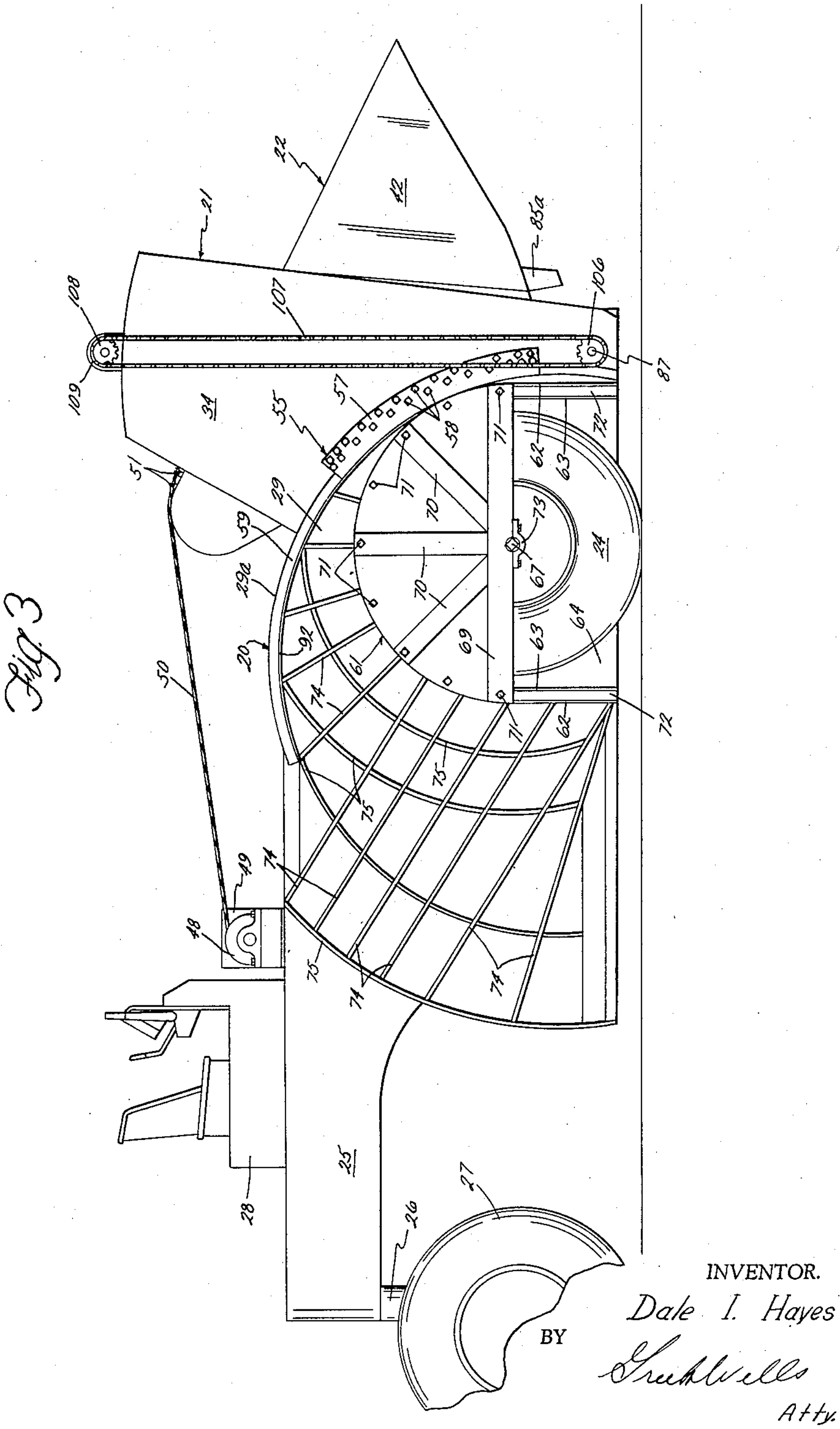
Figure 3 is a side elevational view of the self-loading transport showing the shovel rocked back to deposit scooped up material into the intermediate mold back member, and showing a modified form of the invention.

When the shovel 22 is in its upraised position, as shown in Figures 3 and 7, the rear edges of its side plates 42 or 43 engage in forwardly and upwardly facing U-shaped stop members 52 which are affixed to the inner surfaces of the side plates 34 and 35 of the trough 21. These U-shaped stop members halt the rearward movement of the shovel 22 about the pivot shaft 39 and cause both the trough 21 and the shovel 22 to be pivoted back about the cross shaft 32 upon further operation of the winch 48. It will thus be seen that the single winch cable 50 controls movement of both the shovel 22 and trough 21. Since the center of gravity of each of these members lies forwardly of their pivot points, they are lowered by gravity, and control of the lowering speed can be had by braking the winch 48.

The forward pivotal movement of the trough 21 about the shaft 32 is limited by a pair of inwardly extending lugs 53 which are supported on the side walls 29 and 30 of the body 20 forwardly of the cross shaft 32. These lugs 53 engage with notches 54 provided in the bottom edges of the side plates 34 and 35 of the trough 21 when the trough 21 is in its lowered position, and assist in supporting the trough 21. No such means are provided for supporting the shovel 22 in its lowered position, since it is supported by engagement with the ground.

As disclosed earlier herein, it is the object of this invention to provide means for unloading the transported material from the body 20 of the device through an opening at the front of the body 20 created by removal of the bottom wall 40 of the trough 21. It is therefore necessary to leave the space between the walls 29 and 30 of the body 20 and forwardly of the cross shaft 32 open and unobstructed, as shown in Figure 8. This means that no cross braces may be fixed between the forward positions of the walls 29 and 30. In order to provide adequate cross support for the walls 29 and 30 to prevent spreading, etc. thereof under load without the use of direct cross bracing, I utilize the member 21 itself as a cross support.

As shown in Figures 1 and 3 of the drawings, the top and front edges **29*a* and 30*a* of the side walls 29 and 30 are cut in smooth arcs about the axis of the cross shaft 32 as a center. The side plates 34 and 35 of the member 21 are provided with curved guide members generally indicated by the numeral 55 which overlap the edges 29*a* and 30*a* of the side walls 29 and 30 to retain them against outward movement with respect to the member 21. The construction of the guide members 55 is best shown in Figure 10. As illustrated in this figure, the side plates 34 and 35 of the member 21 are provided with spacer bars 56 that are fixed thereto in close juxtaposition to the curved edges 29*a* and 30*a* of the body side walls 29 and 30. The spacer bars 56 are curved to follow the edges 29*a* and 30*a*. Curved plates 57 are fixed to the spacer bars 56 by bolts 58. The plates 57 extend downwardly to overlap the edges 29*a* and 30*a*. As illustrated in Figure 10, wear plates 59 are fixed to the outer surfaces of the body side walls 29 and 30 adjacent the edges 29*a* and 30*a*, and the plates 57 of the guides 55 engage with the wear plates 59. Removable shims 60 are provided between the plates 57 and spacer bars 56 of the guides 55. As the wear plates 59 and the guide plates 57 wear during use, certain of the shims 60 may be removed to compensate for the wear and to keep the guide members 55 in constant engagement with the wear plates 59 to insure proper support of the side walls 29 and 30. It will be understood from the foregoing that with the construction just described, the member 21, through the engagement of the guide members 55 with the side walls 29 and 30, serves as a major cross tie between the side walls 29 and 30. Since both the edges 29*a* and 30*a* of the walls 29 and 30 and the guide members 55 are curved about the cross shaft 32 upon which the member 21 pivots, rocking movement of the member 21 about the shaft 32 as an axis does not effect the function of the member 21** as a cross tie.

Further cross support for the forward ends of the side walls 29 and 30 is obtained when the shovel 22 is rocked back into engagement with the stop members 52 on the trough 21. When the shovel 22 is thus engaged, it serves to prevent spreading of the walls 34 and 35 of the trough 21 and is thus used to impart rigidity against spreading of the walls 29 and 30 of the body 20.

Figure 4:
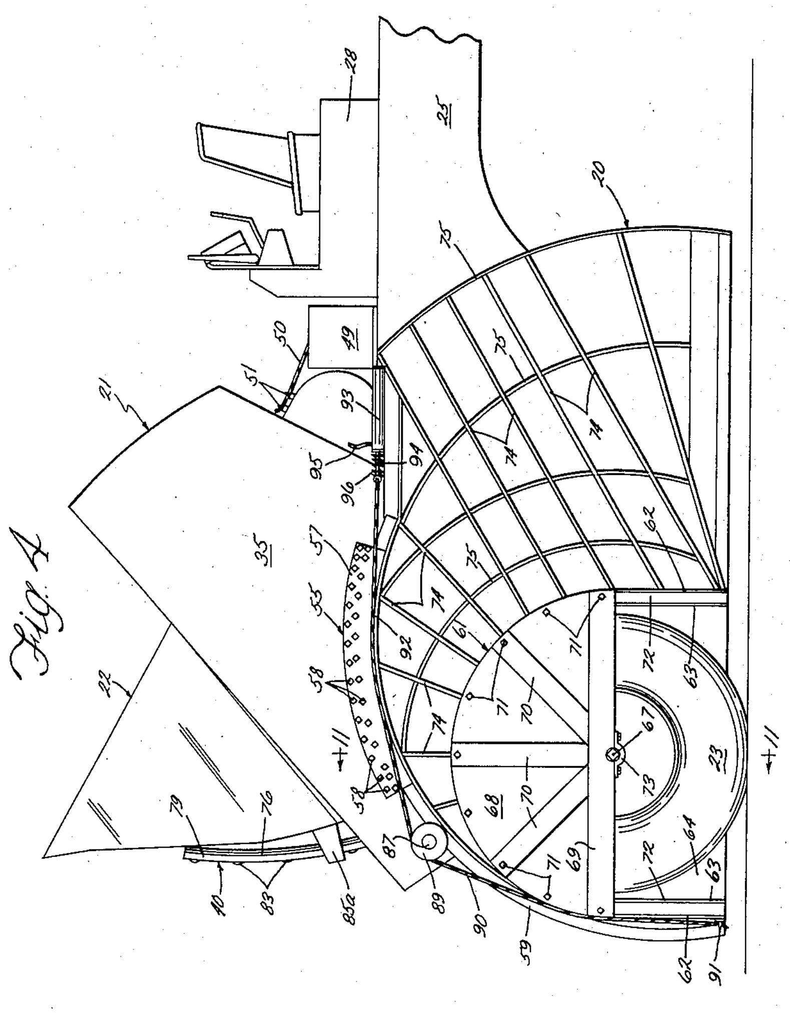
Figure 4 is an elevational view showing both the shovel and the intermediate fold back member rocked back to crowd material into the load receiving body portion of the transport.
Figure 11:
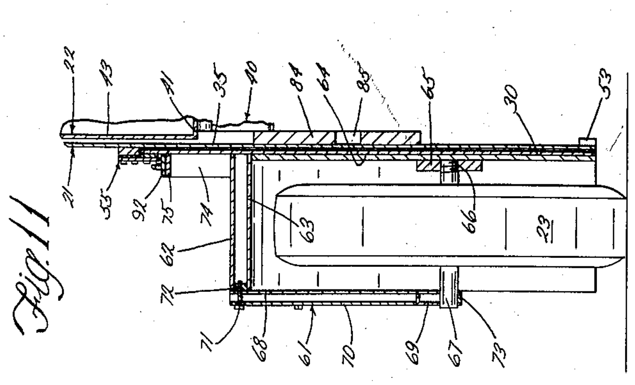
Figure 11 is an enlarged fragmentary sectional view taken on the line 11—11 of Figure 4.
Figure 5:
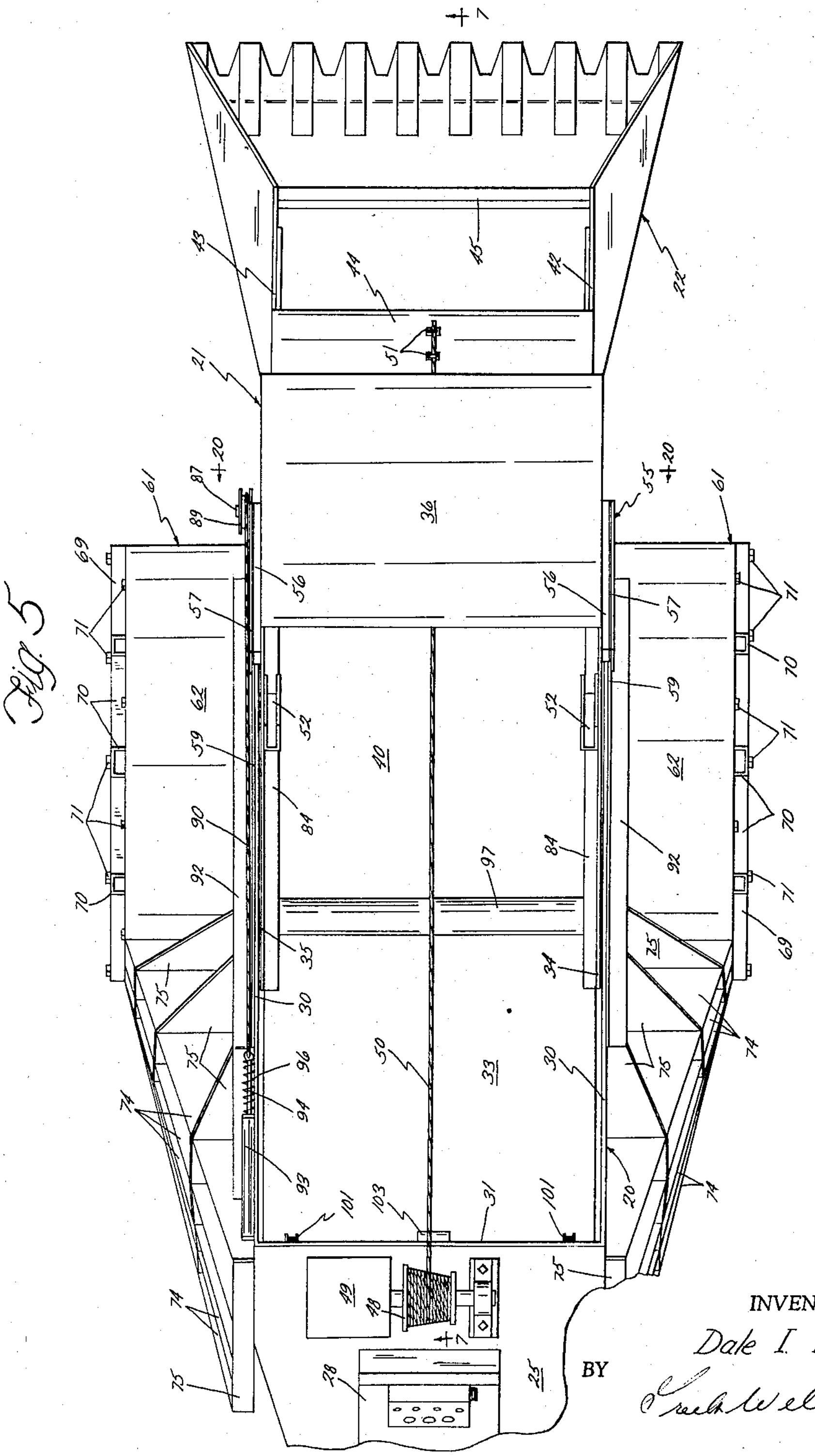
Figure 5 is a plan view of a machine embodying my invention.

As hereinbefore mentioned, the transport is supported for movement along the ground by wheels 23 and 24. The mounting means for each wheel will now be described. As illustrated in Figures 1–5 of the drawings, the wheels are mounted on the body 20 of the device forwardly of the cross shaft 32. The wheels 23 and 24 are mounted in wheel housings 61 which are secured to the side walls 29 and 30 of the body 20. The wheel housings 61, best illustrated in Figures 4 and 11, are identical and it is believed that a description of one will suffice for both. As shown in Figure 4, each wheel housing 61 comprises two inverted U-shaped metal sheets 62 and 63 which are fixed rigidly to, and extend outwardly from the side walls 29 or 30 of the body 20. A reenforcing plate 64 is fixed to the side walls 29 and 30 of the body 20 inside the inner U-shaped sheet 63 as shown in Figure 11. This plate 64 carries an axle receiving member 65 thereon which has an internally threaded aperture 66 therein that receives a stub axle 67.

At the outer edges of the wheel housing sheets 62 and 63 a cover plate 68 is provided. The cover plate 68 is semicircular in shape and has a horizontal channel member 69 fixed thereto along its lower straight edge. Radially extending braces 70 are also provided on the cover plate 68. The cover plate 68 is fixed to the wheel housing sheets 62 and 63 by means of a plurality of bolts 71 that extend through the cover plate 68 and thread into a spacer bar 72 that is secured between the outer edges of the spaced apart wheel housing sheets 62 and 63 as shown in Figure 11. The horizontal channel member 69 fixed on the cover plate 68 has a bearing member 73 thereon which receives and supports the outer end of the stub axle 67.

Figure 9:
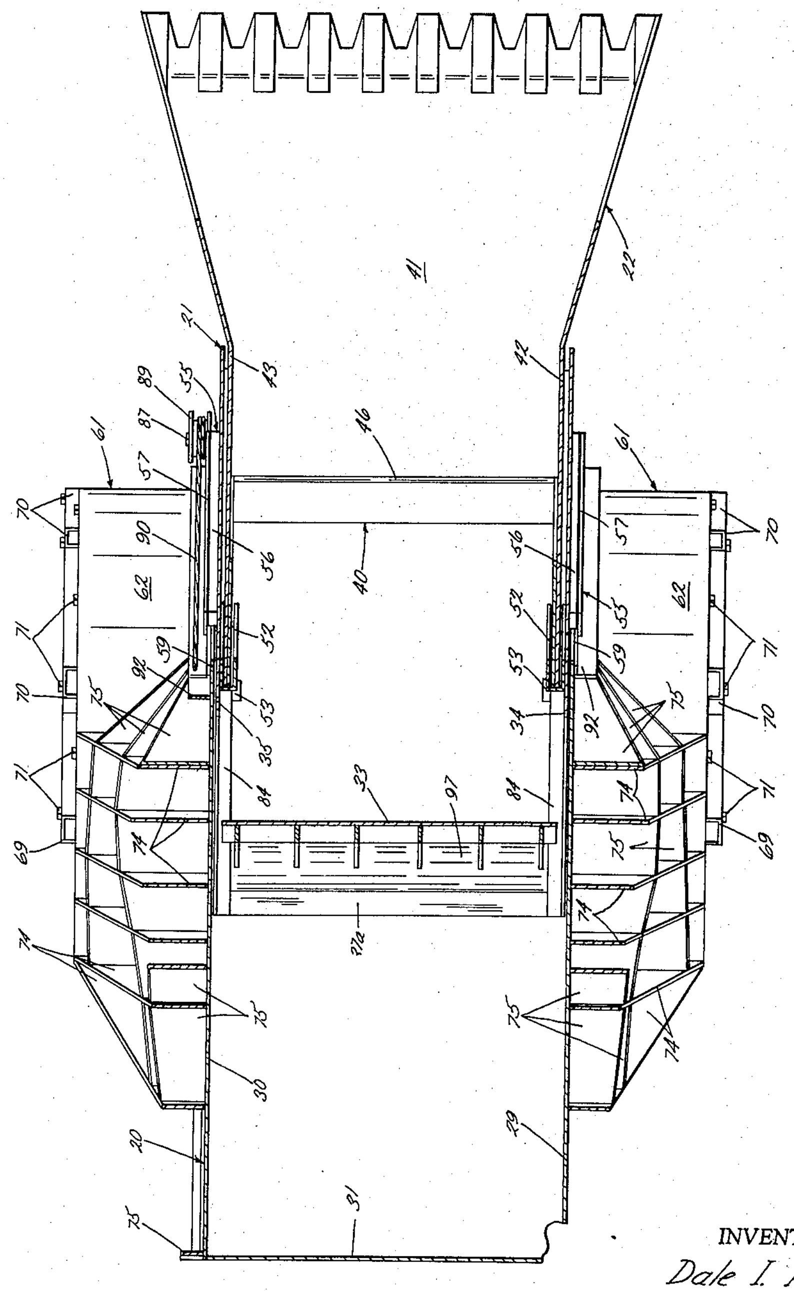
Figure 9 is a sectional view taken on the line 9—9 of Figure 8.
Figure 12:
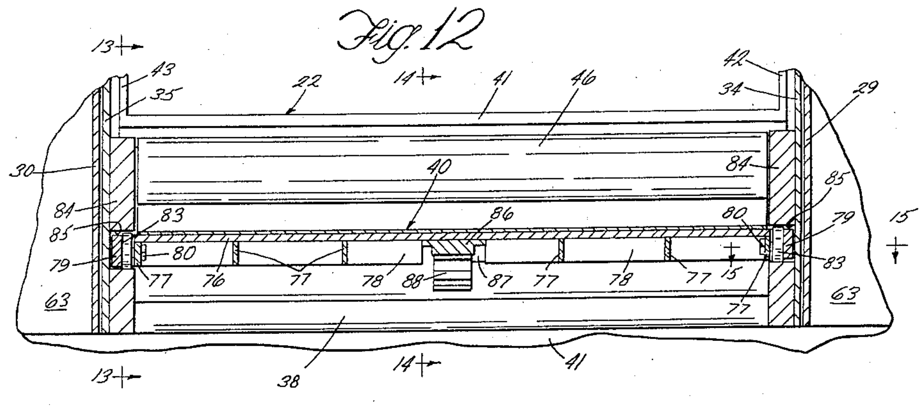
Figure 12 is an enlarged fragmentary sectional view taken on the line 12—12 of Figure 1.

The wheel 23 or 24 is rotatably mounted on the stub axle 67 between the cover plate 68 and the side wall 29 or 30 of the body 20 and supports the body 20 through the wheel housing 61. To provide additional support for the wheel housing 61 just described and to provide further rigidity for the side walls 29 and 30 of the body 20, a plurality of reenforcing ribs 74 are provided on each side wall 29 and 30, as illustrated in the drawings. The reenforcing ribs 74 taper rearwardly and are laid edgewise against the side wall 29 and 30 of the body 20 and extend outwardly therefrom (see Figure 9). The ribs are arranged so that they brace the wheel housing from the top and the rear and strengthen the side walls 29 and 30 too. Gusset plates 75 are provided between the ribs 74 as shown in the drawings to assist in providing support and rigidity for the side walls 29 and 30.

The construction of the bottom wall 40 of the member 21, and the mechanism for removing it will now be described.

As shown best in Figures 6, 7, 8 and 12–15, the bottom wall 40 is slightly curved, so that its upper surface is concave in a fore and aft direction. It is comprised of a main floor plate 76 having longitudinally and laterally extending bracing ribs 77 and 78 fixed to its bottom surface. Along each side of the wall 40 roller carrying plates 79 are provided. These plates 79 (best illustrated in Figures 12, 13 and 15) are positioned alongside the outer longitudinal bracing ribs 77 of the wall 40 and are secured to the ribs 77 by spaced apart bolts 80 which extend through the ribs 77 and thread into the plates 79. Alternate bolts 80 have smoothed shank portions as shown at 81 in Figure 15, and aligned with these smooth shanked bolts depressions or sockets 82 are provided in the plates 79. Rollers 83 are positioned in these sockets 82 and are journalled on the smooth shank portions 81 of the alternate bolts 80. The roller 80 are of such a diameter that they extend slightly above and below the plates 79. At the bottom edge of the side plates 34 and 35 of the member 21, inwardly facing guide plates 84 are affixed. These guide plates 84, best shown in Figures 12 and 13, have arcuate slots 85 formed therein and extending from the front edges thereof rearwardly into close proximity to the sleeve 37 which extends between the sides 34 and 35 of the trough 21 at its lower rear corner. The slots 85 are in height a dimension slightly greater than the diameter of the rollers 83, and the roller carrying plates 79 at each side of the bottom wall 40 are received therein. The rollers 83 rest against the bottom surfaces of the slots 85 and thus support the wall 40 for fore and aft movement with respect to the member 21. With this construction, the bottom wall 40 may be moved from the position shown in Figures 7 and 13, wherein it lies between the side plates 34 and 35 of the member 21 and provides a bottom closure therefor, to the position shown in Figure 8 wherein it lies forwardly of the side plates 34 and 35 and provides an opening between the walls 34 and 35 and in front of the cross shaft 32 through which transported material may be discharged from the body 20. To support the bottom wall 40 in its opened position, I provide a pair of depending brackets 85*a* on the shovel 22. These brackets 85*a* receive and support the wall 40 as it moves from between the side plates 34 and 35, as indicated in Figure 8.

Figure 6:
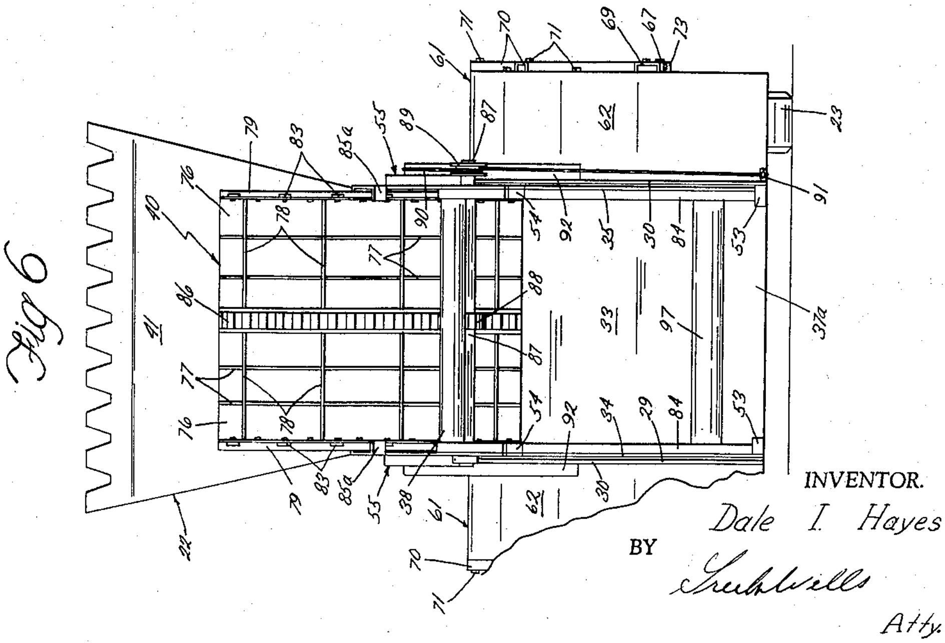
Figure 6 is a front elevational view of the invention showing the device in position to discharge the transported material.
Figure 14:
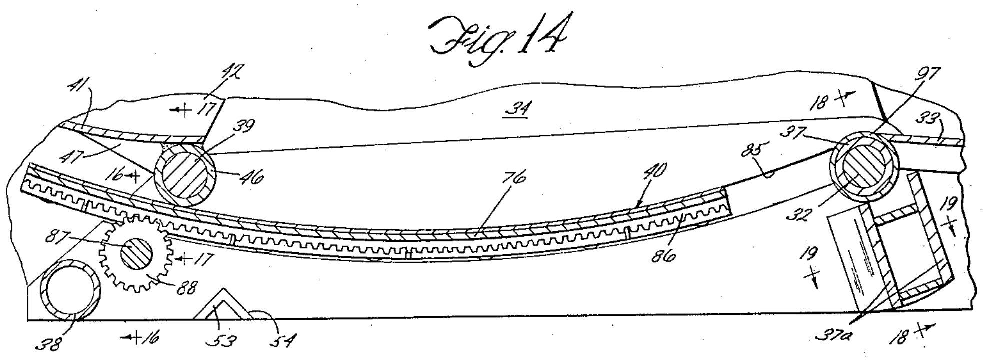
Figure 14 is a fragmentary sectional view taken substantially on the line 14—14 of Figure 12.
Figure 15:
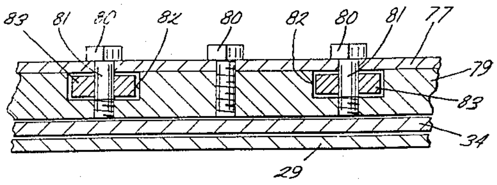
Figure 15 is a fragmentary sectional view taken on the line 15—15 of Figure 12.

In order to move the bottom wall 40, a rack and pinion mechanism is provided. As shown in Figures 6 and 14, a longitudinally extending rack 86 is secured to the under surface of the wall 40 substantially in the center thereof. A cross shaft 87 is journalled between the side plates 34 and 35 near their front lower corners and beneath the bottom wall 40. The shaft 87 has a pinion 88 thereon which is meshed with the rack 86. It will be understood that with this construction, rotation of the shaft 87 will cause the pinion 88 to rotate against the rack 86 and move the bottom wall 40 along the slots 85 between its opened and closed positions.

Figure 16:
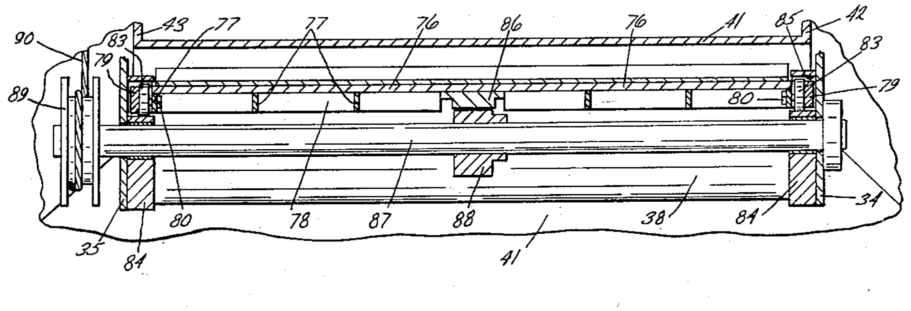
Figure 16 is a fragmentary sectional view taken on the line 16—16 of Figure 14.
Figure 17:
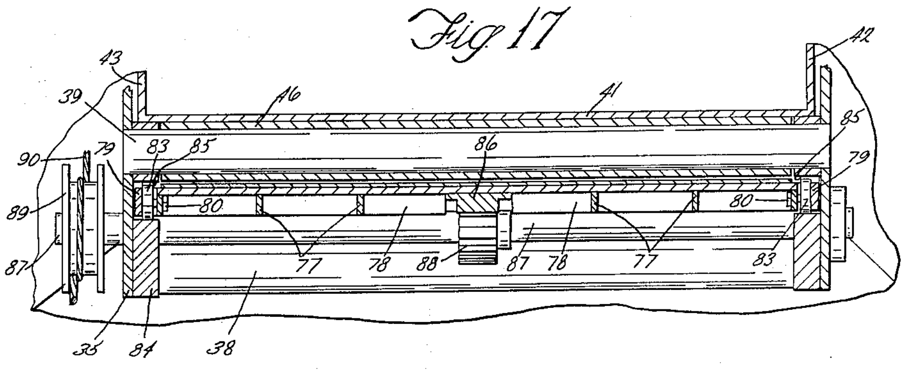
Figure 17 is a fragmentary sectional view taken on the line 17—17 of Figure 14.

As illustrated in Figure 16 of the drawings, the pinion shaft 87 extends outwardly through the side plate 35 of the trough 21, and has a pulley 89 fixed thereon at its outer end. The pulley 89 is positioned a short distance in front of the side wall 30 of the body 20 as indicated in Figure 1. A cable 90 is wrapped at least one full revolution around the pulley 89 and has one end thereof rigidly fixed to the lower front corner of the wheel housing 61 on the side wall 30 as shown at 91 in the drawings. The other end of the cable 90 extends upwardly along a curved cable guide plate 92 which extends upwardly and rearwardly along the side wall 30 parallel to the curved edge 30*a* thereof. As illustrated in Figure 10, the cable guide plate 92 is fixed to the side wall 30 just beneath the wear plate 59 thereon. The cable guide plate 92 leads the cable 90 upwardly and rearwardly to a tensioning cylinder 93 which is mounted at the top of the side wall 30 rearwardly of the wheel housing 61. The tensioning cylinder 93 has a piston 94 extending forwardly therefrom. The cable 90 is rigidly secured to the piston 94. As indicated in Figure 1, the cylinder 93 is a single acting cylinder and has an air supply tube 95 connected at the forward end thereof through which air is supplied under pressure to retract the piston 94. A spring 96 is interposed between the outer end of the piston 94 and the cylinder 93 to maintain the piston 94 in normally extended position. The purpose of the tensioning cylinder 93 is to tighten the cable 90 when it is desired to open the removable bottom wall 40 of the member 21. When the cable 90 is thus tightened, movement of the member 21 from its lowered position as shown in Figure 1, to its upraised position as shown in Figure 4, causes the pulley 89 to be rotated as it moves along the tightened cable 90 by frictional engagement of the pulley 89 with the cable 90. This rotation causes the pinion 88 to rotate against the rack 86 as the member 21 is rocked back whereby to move the bottom wall 40 forwardly along the slots 85 to its opened position illustrated in Figure 8.

It is, of course, not desirable to remove the bottom wall 40 every time the member 21 is rocked back, for the rocking movement of the member 21 is utilized to crowd the loaded material back into the body 20 during the loading operation. When it is desired to rock the trough 21 without opening the bottom wall 40, fluid pressure is removed from the tensioning cylinder 93 to permit the spring 96 to extend the piston 94 and slacken the cable 90. When the cable 90 is slackened there is not sufficient frictional engagement between it and the pulley 89 to rotate the pinion shaft 87 and the bottom wall 40 remains in its closed position.

Figure 13:
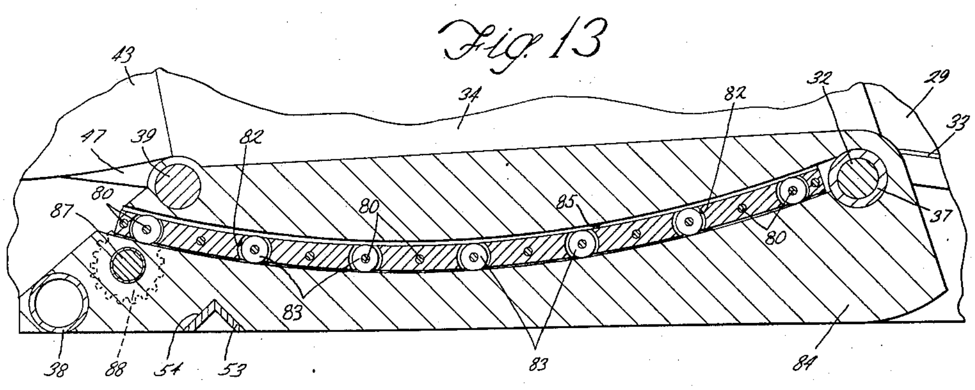
Figure 13 is a fragmentary sectional view taken substantially on the line 13—13 of Figure 12.
Figure 20:
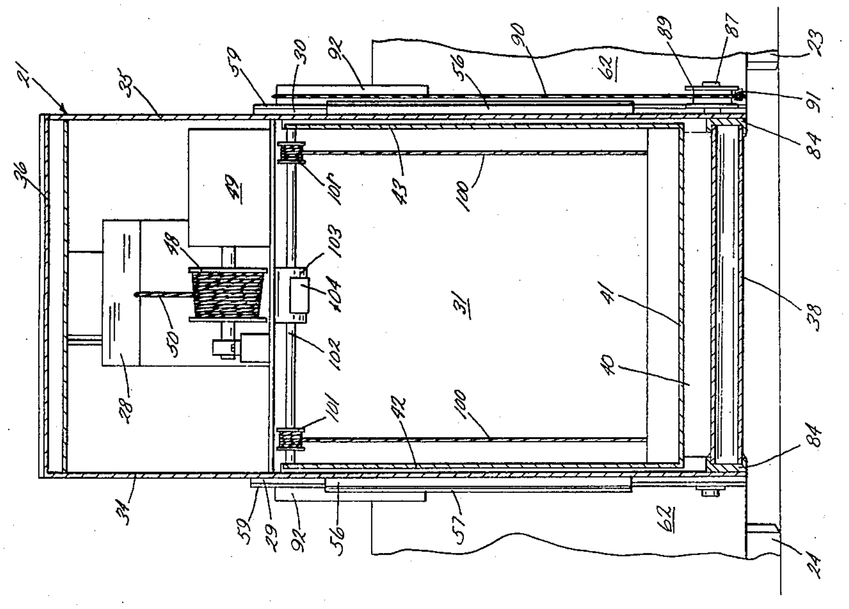
Figure 20 is a sectional view taken on the line 20—20 of Figure 5.

When the transport has been fully loaded, and moved to the unloading area, the unloading operation is commenced by first supplying air to the tensioning cylinder 93 to tighten the cable 90. The winch 48 is then set in motion to rock the shovel 22 which was already raised against the trough, to move the trough member 21 backward toward the uppermost position to cause the wall 40 to be removed forwardly and upwardly to provide a discharge opening between the side walls 29 and 30 of the body 20 and in front of the cross shaft 32. A portion of the transported material will be discharged through this opening by gravity without further manipulation of the machine, but a substantial portion of the material will remain on the bottom wall 33 of the body 20. In order to discharge this portion of the transport material, I provide means for raising the wall 33 about the cross shaft 32 whereby to cause the material thereon to slide forwardly and be discharged through the opening created by removal of the wall 40 of the member 21. As best illustrated in Figures 14 and 18, the bottom wall 33 of the body 20 is connected at its forward end to a transverse sleeve 97 which is rotatably mounted on the sleeve 37 that pivotally supports the member 21 on the cross shaft 32. This sleeve 97 serves to pivotally support the bottom wall 33 of the body 20 for vertical pivotal movement about the cross shaft 32 as a center. Along its rearward edge, the bottom wall 33 is provided with a transversely extending I-beam 98. The I-beam 98 is positioned in close proximity to the rear wall 31 of the body 20 and normally rests upon forwardly extending brackets 99 which are secured to the rear wall 31 along its bottom edge. The brackets 99, together with the transverse shaft 32 support the bottom wall 33. As illustrated in Figures 7, 8 and 20, a pair of control cables 100 are rigidly secured to the rear edge of the bottom wall 33 and extend upwardly therefrom. The cables 100 are wrapped upon winches 101 that are fixed on a transverse shaft 102 journalled between the side walls 29 and 30 of the body 20 adjacent the upper edge of the rear wall 31. It will be appreciated that by rotating the shaft 102, the cables 100 can be wound or unwound from the winches 101 to raise or lower the rear wall 33 of the body 20 between the positions illustrated in Figures 7 and 8. In order to drive the shaft 102 to perform this raising and lowering operation, a motor 103 is provided. As illustrated in Figure 13, the motor 103 is mounted on a bracket 104 secured to the rear wall 31 of the body 20.

It will be seen from the foregoing, that the machine hereinbefore described provides an extremely efficient self-loading transport vehicle for use in picking up, transporting, and unloading loose material such as ore, rock, sand, or the like. The loading operation, carried out through manipulation of the shovel 22 and the trough 21, is controlled solely by means of the winch 48 and the cable 50. By proper manipulation of the winch 48, the shovel 22 can be rocked back and forth between the positions illustrated in Figures 1 and 3 of the drawings, without movement of the member 21, and by proper manipulation of the winch 48, both the shovel 22 and the trough member 21 can be rocked back and forth between the positions illustrated in Figures 3 and 4 of the drawings. By the simple operation of the tensioning cylinder 93 to tighten the normally slack cable 91 the transport can be conditioned to unload its transported material. When the cylinder 93 has been operated to tighten the cable 91, operation of the winch 48 to rock the member 21 back to its upraised position will cause the bottom wall 40 of the member 21 to be moved forwardly and upwardly to create a discharge opening between the side walls 29 and 30 of the body 20 and in front of the cross shaft 32. When this opening has been created, the entire load may be discharged by the simple movement of the bottom wall 33 of the body 20 upwardly about the cross shaft 32 by operation of the motor 103.

Examination of the drawings will show that the load carried by the transport is discharged between the forward ends of the side walls 29 and 30 of the body 20. If the material is being dumped onto the ground surface, the area in front of the cross shaft 32 and between the walls 29 and 30 will normally be filled before the entire load of the transport is discharged. Additional dumping space may be created by the simple act of withdrawing the transport away from the discharged material during the dumping operation. This withdrawal movement need not inconvenience the operation of the device, for if it is properly timed, it may constitute the commencement of the return trip to the loading area.

It will be noted that the side walls 29 and 30 confine the discharged material therebetween and prevent the pile from spreading out against the supporting wheels or into their path of travel. The walls 29 and 30 thus protect the wheels from damage caused by engagement of discharged material therewith or encroachment of discharged material into their path. Because of this efficient shielding, it is possible to utilize the more desirable rubber tires on the wheels 23 and 24 instead of less suitable but more sturdy means.

Figure 22:
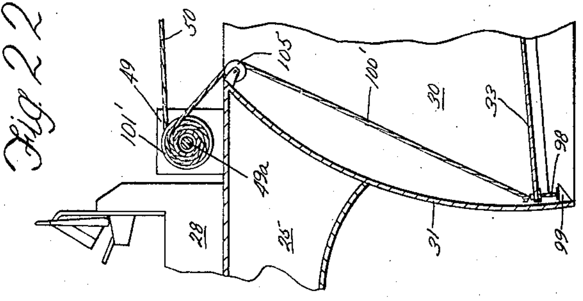
Figure 22 is a sectional view taken substantially on the line 22—22 of Figure 21.
Figure 21:
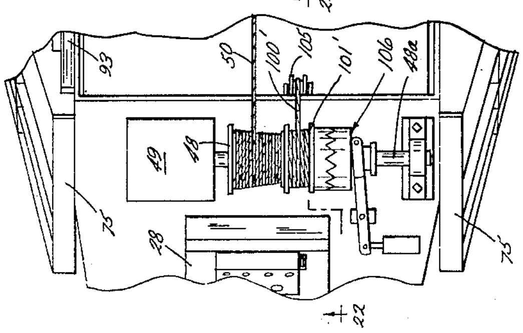
Figure 21 is a fragmentary plan view illustrating a modified means for tilting the bottom wall of the body member.

While I have shown an independent motor 103 for controlling the pivotal movement of the bottom wall 33 of the body 20, I do not intend to limit the invention to this construction. As illustrated in Figures 21 and 22 the power plant 49 for the main winch 48 may be utilized as the power source for raising the wall 33. As illustrated in these figures, a bottom wall raising winch 101′ may be rotatably mounted on the drive shaft **49*a* which drives the main winch 48. A single control cable 100′ may be wrapped on the winch 101′ and lead downwardly over an idler 105 fixed on the rear wall 31 of the body 20 and thence down to the rear edge of the rear wall 33. Clutch means 106 may be provided to drivingly connect the drive shaft 49*a* to the winch 101′. With this construction, the operator can, while the winch 48 is being utilized to rock the trough 21 back and move its bottom wall forwardly and upwardly, engage the clutch 106 to drive the winch 101′ to raise the bottom wall 33 of the body 20** at the same time that the discharge opening is being created.

In Figure 3 of the drawings, I have illustrated a slightly modified form of the invention wherein the operating mechanism for removing the wall 40 of the member 21 is independently operable. In the main form of the invention, I have made use of the rearward rocking movement of the member 21 to remove the bottom wall 40. In certain instances, however, it may be desirable to provide an independent actuating means for the wall 40, and in such instances the construction illustrated in Figure 3 may be utilized. As shown in this figure, the pinion shaft 87 that is journalled between the side plates 34 and 35 of the member 21 may be provided at one end with a sprocket wheel 106 in place of the friction pulley 89. A sprocket chain 107 may be utilized to drivingly connect the sprocket 106 to a drive sprocket 108 secured to the drive shaft of a motor 109 mounted atop the member 21. With this construction, the bottom wall 40 of the trough member 21 can be moved at will by operation of the motor 109.

It will be seen that the construction hereinbefore described provides a unique combination. The body 20, fold back member 21 and shovel 22 provide a unitary structure capable of scooping up and loading material such as dirt, rock, sand, or ore into its load receiving portion for transportation to a discharge point. The bottom wall 40 of the fold back member 21 and the bottom wall 33 of the body 20 provide front and rear bottom walls which form a continuous load carrying surface for the body of the machine. The bottom wall 41 of the shovel 22 forms an additional load carrying surface and when rocked back, forms in addition, a front closure to confine the transported material. Both the front and rear bottom walls 40 and 33 are movable from their normal load receiving position to discharge the transported material at the front of the body. The front and rear bottom walls 40 and 33 are each mounted for vertical pivotal movement about the cross shaft 32 whereby to tilt the bottom surfaces of the transport for discharge of the material thereon by force of gravity. In addition, the front bottom wall 40 is slidable forwardly between the vertical side plates or walls 34 and 35 of the fold back member or trough 21 and away from the cross shaft 32 to create an opening at the front of the shaft 32 through which the transported material may be carried by gravitational force.

When the transport is fully loaded, and it is desired to discharge the material, it is, of course, impractical to pivot both the front and rear bottom walls 40 and 33 upwardly before sliding the front bottom wall 40 away from the cross shaft 32 to create the discharge opening, since this would involve unnecessary lifting and squeezing of the load. At the same time, it is not necessary to slide the front bottom wall 40 all the way forwardly while the fold back member 21 is in its lower position with the weight of all the transported material resting thereon. I have found that the best results may be obtained and the least power expended if the front bottom wall 40 is moved forwardly as the fold back member 21 is raised about the pivot shaft 32, and if the rear bottom wall 33 is left in its lowermost position until part of the load is discharged. As the fold back member 21, and the front bottom wall 40 are pivoted upwardly the weight of the material thereon is shifted rearwardly on the front bottom wall thus lessening the resistance to movement of the front bottom wall. As soon as the front bottom wall 40 has been moved enough to permit discharge of material through the opening created, the load thereon is rapidly lessened. When the front bottom wall 40 has been moved to its forward limit, most of the load will slide out, leaving only a part of the original load remaining on the rear bottom wall. This remaining part is discharged when the rear bottom wall is pivoted upwardly and as the transport is withdrawn from the discharged pile of material.

The several mechanisms disclosed herein for moving the front bottom wall 40 and the rear bottom wall 33 are all adapted for carrying out the unloading procedure outlined above. When the mechanism for moving the front bottom wall which includes the friction pulley 89 and the cable 90 is employed, removal of the front bottom wall to create the discharge opening is automatic upon pivotal movement of the fold back member 21. When the mechanism shown in Figure 3 is employed the front bottom wall 40 may, of course, be moved at will. Elevation of the rear bottom wall 33 may be effected at will be energization of the motor 103, or in the event that the mechanism disclosed in Figures 21 and 22 is employed for moving the rear bottom wall, elevation thereof at the proper time may be effected by engaging the clutch 106 to actuate the winch 101′ when the fold back member has reached a point substantially midway of its upper and lower limits.

The construction hereinbefore described is also specifically adapted to provide a strong and rigid transport capable of handling heavy loads in rough and punishing circumstances. While the unloading concept embodied in my invention requires that the portions of the side walls 29 and 30 forward of the cross shaft 32 be free of direct cross bracing and cross tying structures to permit the material being unloaded to fall therebetween, and to permit the transport to be backed away during and after the unloading process, the unique construction of my fold back member 21 and its connection to the side walls 29 and 30 through the guide means 55 at each side utilizes the fold back member 21 as a cross tie member for the front edges of the walls 29 and 30 to provide the necessary support without hampering the use of the device. The necessary cross tie of the front portions of the side walls 29 and 30 is thus obtained with no restriction of the discharge.

The construction hereinbefore described also provides adequate and rigid support for the ground engaging wheels 23 and 24 without the necessity of a transverse axle between the walls 29 and 30, and provides adequate protection of the vulnerable tires during the dumping procedure and while the transport is being withdrawn from the dumping area.

The operation of my improved self loading transport is believed evident from the foregoing description. To load the transport, the operator merely manipulates the winch 48 to cause the desired movement of the shovel 22 and the trough 21 as disclosed in my prior patents hereinbefore identified. When it is desired to unload, the operator merely manipulates the mechanism as hereinbefore described to slide the bottom wall 40 of the fold back member forwardly to create the discharge opening, and raises the rear bottom wall 33 to complete discharge of the transported material from the vehicle.

Having thus described my invention, I claim:

1. In a self loading transport adapted for loading and unloading loose aggregate through the front end, a vehicle body comprising a back wall, forwardly extending side walls joined to said back wall, a rear bottom wall extending forwardly from the back wall, means supporting the front end of said bottom wall and connecting the side walls, a fold back trough shaped member having side walls overlapping the body side walls and pivoted at their lower rear corners to the body between the body side walls, a trough shaped shovel having its lower rear end pivotally supported in the front lower portions of the trough side walls, a front bottom wall slidably mounted in the side walls of said trough shaped member and extending forwardly from the rear bottom wall beneath the rear end of the shovel, means on the body to rock said shovel and said member rearwardly and upwardly toward said body, and means to slide said front bottom wall forwardly beneath the shovel.

2. The invention defined in claim 1 wherein the body side walls have front edges curved about the pivots of the side walls of said fold back member, and the sides of said fold back member have channels slidably receiving said curved front edges and opposing spreading of the body side walls.

3. The invention defined in claim 1 wherein the means to slide said front bottom wall forwardly embodies a rack gear on the bottom surface of said front bottom wall and a pinion carried by said member driving said rack.

4. The invention defined in claim 1 wherein the means to slide said front bottom wall is actuated by movement of the fold back member.

5. In a self loading transport adapted for loading and unloading through the front end, a vehicle body comprising a back wall, forwardly extending side walls joined by said back wall, a rear bottom wall extending from one side wall to the other, an axle connecting the side walls pivotally mounting the forward end of said rear bottom wall, the body having support means limiting the downward movement of the rear bottom wall, a fold back trough member having side walls overlapping the body side walls, and pivoted at their rear lower corners on said axle, an open backed shovel having its rear lower end pivotally supported in the front lower portions of the trough side walls, a sliding bottom wall in said fold back member extending forwardly from said rear bottom wall to the shovel, means to rock said shovel and said member about their pivotal mountings rearwardly and upwardly toward said body, and means to slide said last named bottom wall forwardly beneath the shovel.

6. A self loading transport comprising a body member including spaced apart forwardly extending side walls, wheel means journalled on said side walls for supporting the transport for movement, a trough shaped fold back member having vertical side walls positioned between the side walls of the body member near the forward end of the body member, said fold back member being pivoted between the side walls of the body member on a transverse horizontal axis, a trough shaped shovel member pivoted to the fold back member and extending forwardly therefrom, a movable bottom wall slidably mounted between the vertical side walls of the fold back member, means on the transport to rock the shovel member and the fold back member rearwardly and upwardly with respect to the body member, and means on the transport to slide the movable bottom wall forwardly between the side walls of the fold back member to create an opening between the side walls thereof for discharge of material carried by the transport.

7. The invention defined in claim 6 wherein the body side walls have front edges curved about the pivots of the side walls of said fold back member, and the sides of said fold back member have channels slidably receiving said curved front edges and opposing spreading of the body side walls.

8. In a self loading transport adapted for loading and unloading through the front end, a vehicle body having a back wall, forwardly extending side walls joined by said back wall, a rear bottom wall positioned between the side walls, said rear bottom wall terminating at a point spaced rearwardly from the forward ends of the side walls, a trough shaped fold back member having spaced apart vertical side walls, said fold back member being positioned between the side walls of the body in front of the rear bottom wall and being pivoted to the body on a horizontal transverse axis, a trough shaped shovel member pivoted to the fold back member and extending forwardly therefrom, a front bottom wall slidably mounted between the side walls of the fold back member for movement forwardly thereof, means on the transport to rock the shovel member and the fold back member rearwardly, and means on the transport to slide the front bottom wall forwardly to create an opening between the side walls of the fold back member and in front of the rear bottom wall for discharge of material carried by the transport.

9. The invention defined in claim 8 wherein the body side walls have front edges curved about the pivots of the side walls of said fold back member, and the sides of said fold back member have channels slidably receiving said curved front edges and opposing spreading of the body side walls.

10. The invention defined in claim 8 wherein the means to slide said front bottom wall forwardly embodies a rack gear on the bottom surface of said first bottom wall and a pinion carried by said member driving said rack.

11. In a self loading transport adapted for loading and unloading through the front end, a vehicle body having a back wall, forwardly extending side walls joined by said back wall, a rear bottom wall positioned between the side walls, said rear bottom wall terminating at a point spaced rearwardly from the forward ends of the side walls, a trough shaped fold back member having spaced apart vertical side walls, said fold back member being positioned between the side walls of the body in front of the rear bottom wall, a transverse horizontal pivot means on the side walls of the body at the front end of the rear bottom wall, said rear bottom wall and said fold back member both being pivoted to said pivot means for vertical pivotal movement, a trough shaped shovel member pivoted to the fold back member and extending forwardly therefrom, a front bottom wall extending between the side walls of the fold back member and mounted thereon for forward sliding movement, means on the transport to rock the shovel member and the fold back member rearwardly and upwardly, means on the transport to slide the front bottom wall forwardly between the side walls of the fold back member to create an opening in front of the rear bottom wall for discharge of material, and means on the transport to raise the rear bottom wall about the pivot means to discharge material thereon through said opening.

12. The invention defined in claim 1 wherein the means for sliding the front bottom wall forwardly comprises a rack affixed to the underside of the front bottom wall, a transverse shaft journalled in the fold back member beneath the front bottom wall, a pinion fixed on said shaft and meshing with the rack whereby to move the front bottom wall upon rotation of the shaft, and means on the transport to rotate the shaft.

13. The invention defined in claim 11 wherein the means for sliding the front bottom wall forwardly comprises a rack affixed to the underside of the front bottom wall, a transverse shaft journalled in the fold back member beneath the front bottom wall, a pinion fixed on said shaft and meshing with the rack whereby to move the front bottom wall upon rotation of the shaft, a friction pulley fixed on said shaft, a slack cable wound around said friction pulley, said cable being anchored at both ends to the body, and means to tighten said cable whereby to cause it to frictionally grip the pulley and to cause said pulley to be rotated to drive the pinion shaft and move the front bottom wall upon rearward and upward movement of the fold back member with respect to the body.

14. In a self loading transport adapted for loading and unloading through the front end, a vehicle body having a back wall, forwardly extending side walls joined by said back wall, a rear bottom wall positioned between the side walls, said rear bottom wall terminating at a point spaced rearwardly from the forward ends of the side walls, a trough shaped fold back member having spaced apart vertical side walls and having a front bottom wall slidably mounted on its side walls for forward movement, said fold back member being positioned between the side walls of the body in front of the rear bottom wall, a transverse horizontal pivot means on the side walls of the body at the front end of the rear bottom wall, said rear bottom wall and said fold back member both being pivoted to said pivot means for vertical pivotal movement, means on the transport to rock the fold back member rearwardly and upwardly, means on the transport to slide the front bottom wall forwardly between the side walls of the fold back member to create an opening in front of the rear bottom wall for discharge of material, and means on the transport to raise the rear bottom wall about the pivot means to discharge material thereon through said opening.

References Cited in the file of this patent

UNITED STATES PATENTS 2,153,781 Vote ---------------- Apr. 11, 1939
2,743,828 Hayes ---------------- May 1, 1956